(12) United States Patent
Plank et al.

(10) Patent No.: US 8,057,837 B2
(45) Date of Patent: *Nov. 15, 2011

(54) MICROWAVE POPCORN WITH VISCOUS LIQUID FAT AND METHOD OF PREPARATION

(75) Inventors: David W. Plank, Taylors Falls, MN (US); Jessica Raby Luger, Minneapolis, MN (US); Kory M. Kolvig, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 1237 days.

This patent is subject to a terminal disclaimer.

(21) Appl. No.: 11/246,610

(22) Filed: Oct. 7, 2005

(65) Prior Publication Data

US 2006/0078655 A1    Apr. 13, 2006

Related U.S. Application Data

(60) Provisional application No. 60/616,772, filed on Oct. 7, 2004.

(51) Int. Cl.
*A23D 7/005* (2006.01)
*A23D 9/007* (2006.01)
*B65D 81/34* (2006.01)
*A23L 1/36* (2006.01)

(52) U.S. Cl. ........ 426/607; 426/394; 426/107; 426/309; 426/93; 426/625

(58) Field of Classification Search .................. 426/601, 426/607, 93, 394, 410, 107, 111, 302, 309, 426/272, 625, 307
See application file for complete search history.

(56) References Cited

U.S. PATENT DOCUMENTS

| | | | |
|---|---|---|---|
| 3,669,681 A | 6/1972 | Shoaf et al. | |
| 4,409,250 A | 10/1983 | Van Hulle et al. | |
| 4,450,180 A | 5/1984 | Watkins | |
| 4,548,826 A | 10/1985 | Watkins | |
| 4,735,513 A | 4/1988 | Watkins et al. | |
| 4,878,765 A | 11/1989 | Watkins et al. | |
| 4,973,810 A | 11/1990 | Brauner | |
| 5,102,679 A | 4/1992 | Whalen | |
| 5,488,220 A | 1/1996 | Freerks et al. | |
| 5,529,800 A | 6/1996 | Bourns et al. | |
| 5,635,238 A * | 6/1997 | Trinh et al. ................... | 426/650 |

(Continued)

FOREIGN PATENT DOCUMENTS

EP    1477072 A1 * 11/2004

(Continued)

*Primary Examiner* — Viren Thakur
(74) *Attorney, Agent, or Firm* — Dale A. Bjorkman; John A. O'Toole (57) ABSTRACT

Disclosed are microwave popcorn articles including a thickened liquid (at room temperature) oil and their methods of preparation. The microwave popcorn articles comprise any conventional microwave popcorn bag or container, and a food charge disposed therein comprising kernel popcorn and/or puffable pellets; 1% to 45% liquid (at room temperature) oil; and, 0% to 4% salt. The oil ingredient has a melting point of $\leq 25°$ C. The oil ingredient includes an oil thickening ingredient especially a starch based oil thickening ingredient such as a cyclodextrin in amounts sufficient to dimensionally stabilize the oil. By avoiding hydrogenation to solidify the oil into a solid fat at room temperatures, finished popcorn products can be provided that are desirably low in trans fatty acid content. The methods of preparation include preparing a heated oil thickened with cyclodextrin complexed with the oil and adding the thickened oil to the microwave container.

11 Claims, 1 Drawing Sheet

U.S. PATENT DOCUMENTS

| | | | | |
|---|---|---|---|---|
| 5,660,845 | A * | 8/1997 | Trinh et al. | 424/418 |
| 5,679,278 | A | 10/1997 | Cox | |
| 5,690,979 | A | 11/1997 | Bourns et al. | |
| 5,780,089 | A * | 7/1998 | Lee | 426/533 |
| 5,897,894 | A | 4/1999 | Glass | |
| 5,958,482 | A | 9/1999 | Monforton | |
| 6,013,291 | A | 1/2000 | Glass et al. | |
| 6,046,443 | A | 4/2000 | Ackerman et al. | |
| 6,066,346 | A | 5/2000 | Hunt et al. | |
| 6,083,552 | A | 7/2000 | Kershman et al. | |
| 6,231,903 | B1 | 5/2001 | Ji et al. | |
| 6,259,079 | B1 | 7/2001 | Ji et al. | |
| 6,287,603 | B1 * | 9/2001 | Prasad et al. | 424/489 |
| 6,306,448 | B1 | 10/2001 | Martuch et al. | |
| 6,348,229 | B1 * | 2/2002 | Eini et al. | 426/611 |
| 6,444,253 | B1 * | 9/2002 | Conklin et al. | 426/651 |
| 6,582,748 | B1 | 6/2003 | Loh et al. | |
| 6,746,700 | B1 * | 6/2004 | Landon | 426/93 |
| 7,105,195 | B2 * | 9/2006 | Plank et al. | 426/601 |
| 7,736,684 | B2 * | 6/2010 | Plank et al. | 426/607 |
| 2002/0122870 | A1 * | 9/2002 | McBride et al. | 426/651 |
| 2003/0044490 | A1 * | 3/2003 | Qi et al. | 426/98 |
| 2003/0099747 | A1 * | 5/2003 | Eini et al. | 426/401 |
| 2004/0010471 | A1 | 1/2004 | Lenard et al. | |
| 2004/0161510 | A1 * | 8/2004 | Hester | 426/383 |

FOREIGN PATENT DOCUMENTS

| | | | |
|---|---|---|---|
| JP | 55034042 A * | 3/1980 | |
| WO | WO 02065859 A1 * | 8/2002 | |

* cited by examiner

FIG. 1

MICROWAVE POPCORN WITH VISCOUS LIQUID FAT AND METHOD OF PREPARATION

This application claims the benefit of priority under 35 U.S.C. §119(e)(1) of a provisional patent application Ser. No. 60/616,772, filed Oct. 7, 2004, which is incorporated herein by referenced in its entirety.

BACKGROUND OF THE INVENTION

The present invention relates to packaged food products. More particularly, the present invention relates to microwave popcorn product articles characterized by having a thickened liquid oil fat component and to methods for filling such articles.

Broadly, the present invention is an improvement upon the microwave packaged food articles described in U.S. Pat. No. 6,013,291 "Microwave Popcorn With Liquid Fat and Method of Preparation (issued Jan. 11, 2000 to Brian Glass). The '291 patent describes microwave popcorn articles comprising food charges disposed within a microwave popcorn bag comprising unpopped or kernel popcorn and a quantity of liquid fat in addition to salt, flavor and other minor ingredients. The present invention is an improvement by substituting or including the thickened liquid fat compositions such as are described in U.S. Ser. No. 60/581,993 "VISCOUS FAT COMPOSITIONS HAVING LOW AMOUNTS OF TRANS-FAT, METHODS AND PRODUCTS" (filed Jun. 22, 2004 to David Plank) to provide improved product properties. Moreover, the desirable features of the '291 patent of providing a food product having low levels of trans fatty acids can be maintained.

Popcorn is a highly popular snack food item. In the past, the at-home preparation of popcorn by the consumer involved adding kernel popcorn plus a cooking oil to a covered pot and heating until the popcorn kernels popped to make popcorn. As used herein, "kernel popcorn" refers to unpopped popcorn. The noun "popcorn" or synonymously "popped popcorn" refers herein to popped kernel popcorn. The adjective "popcorn" can refer to either. Once prepared, common, relatively coarse, table salt is a frequently added flavoring or condiment. The resultant salted popped popcorn is a familiar snack food.

More recently, microwave popcorn products have become extremely popular. At present, in the U.S., over 70 different brands of microwave popcorn products are available. In general, the more popular microwave popcorn products comprise an expandable paper bag containing a charge of kernel popcorn, fat and salt. The microwave popcorn article is adapted to be heated in a microwave oven for three to five minutes to produce the popped popcorn. More recently, improved microwave popcorn articles have been fabricated employing a metallized susceptor which facilitates the heating of the kernel popcorn-fat charge and which, in turn, leads desirably to increases in popcorn volume and decreases in unpopped kernels. Microwave popcorn articles of this type are described in detail in, for example, U.S. Pat. No. 4,450,180 (issued May 22, 1984 to J. D. Watkins and incorporated herein by reference).

Microwave popcorn articles, of course, comprise a microwave popping bag and a charge of kernel popcorn, fat, and, usually, salt. Certain early patents taught the addition of kernel popcorn, fat and salt in the form of a prefabricated toroid or doughnut shaped piece. The piece was fabricated by mixing the kernel popcorn, salt and melted fat to form a blend and the blend was allowed to cool and harden into the toroid shape desired. These circular pieces were then dropped into the desired chamber of the popcorn bag prior to final sealing. (See for example U.S. Pat. No. 4,450,180, issued May 22, 1984).

Contemporary methods of filling microwave popcorn bags, however, employ a different filling process and technique. (See, for example, U.S. Pat. No. 4,604,854 entitled "Machine For Forming, Filling and Sealing Bags," issued Aug. 12, 1986 to D. W. Andreas). The microwave bags having an unsealed open end are advanced to a first kernel popcorn filling station. While being maintained in an open position, the kernel popcorn is charged to the desired channel. Thereafter, the bags are advanced to a second filling station at which the fat/salt slurry is added to the bag. These products typically employ a hydrogenated fat that is solid at room temperatures. Prior to filling, the fat is heated to well above its melting point to form a liquid oil. Typically, the slurry is added in the form of a vertically dispensed pencil jet (i.e., a confined stream) of the slurry. Single station filling methods are also known that involve applying the fat/salt slurry as a spray onto the kernel popcorn as the kernel popcorn falls into the bag. (See, for example WO 95/01105 entitled "Reduced Fat Microwave Popcorn and Method of Preparation" published Jan. 12, 1995, or, equivalently, U.S. Pat. No. 5,960,979 issued Nov. 25, 1997) which is incorporated herein by reference. Such single station filling techniques are especially useful for the preparation of low fat microwave popcorn products.

The bags now containing both kernel popcorn and slurry are then advanced to a sealing station where the bags are provided with a top seal to complete the closure of the bag. The sealed popcorn bags are advanced to subsequent finish packaging operations which complete the folding of the bags, providing the bags with an overwrap, and inserting appropriate numbers of the bags into cartons, etc. As the heated fat cools and solidifies, a dimensionally stable food charge is formed that is resistant to oil leakage due to the fat being in a solid state.

Current varieties of microwave popcorn products include full fat products (e.g., 20-45% fat), reduced fat (10-20% fat) and low fat products ($\leq$10%).

Regardless of fat content, conventional microwave popcorn products generally employ a partially hydrogenated vegetable oil (usually soybean oil) which is solid at room temperature. Hydrogenation increases oil stability and provides a solid oil or fat, which is less prone to wicking out of the bag during extended storage. A typical melting point range for such an oil would be about 37-40° C. While useful, hydrogenated high melting point fats have high concentrations of saturated fats and trans fatty acids. Current heath trends are concerned with the possible adverse health impact of consumption of saturated fats and trans fatty acids. Ingestion of saturated fats and trans fatty acids adversely affect serum cholesterol and have been linked as a causative for contributory factor in coronary heat disease. In some newer microwave popcorn products, traditional hydrogenated fats have been replaced with naturally occurring fats that are solid at higher than room temperatures (e.g., having melting points higher that 30° C.) such as palm kernel oil and thus do not require hydrogenation. While useful in that such naturally occurring fats are naturally low in trans fatty acids by avoiding hydrogenation, such naturally solid at room temperature fats are nonetheless generally high in undesirable saturated fats.

The '291 patent teaches employment of liquid oils in microwave popcorn products to overcome certain problems caused by production of microwave popcorn products during winter months using cold corn. Liquid oils are taught to be used to prevent manufacturing problems associated with premature congealing of melted hydrogenated fats upon contact with the cold corn. The '291 patent also teaches that another advantage of employing liquid oil is that the microwave popcorn prepared therefrom is desirably lower in undesirable saturated fat and trans fatty acids.

While useful, problems remain in preparing microwave popcorn products employing liquid oils. In particular, oil leakage or seeping can occur during distribution and storage. One solution is to employ a microwave popcorn bag fabricated with a oil and moisture impervious film layer in addition to the conventional bag layers (see for example, U.S. Pat. No. 5,679,278 "Microwaveable Container for Liquid Oils" issued Oct. 21, 1997 to David H. Cox) that is fabricated to provide a leak proof container. However, such a bag construction requires employment of a particular three ply bag laminated packaging roll stock as well as particular fabrication techniques to form a sealed microwave bag container in stead of the conventional two ply bag packaging roll stock. Such particular packaging material can add to the product costs. Also, current product production procedures employ high speed production lines and any added seal forming steps both require additional manufacturing equipment and can adversely impact line production speeds.

In view of the prior art and the problems described above, there is a continuing need for new and useful microwave popcorn products that that are reduced or low in fat that are low in saturated fat and trans fatty acids that nonetheless are resistant to oil leakage and seeping. Accordingly, it is an object of the present invention to provide microwave popcorn products containing liquid oil fat ingredients levels that are low in saturated fats and trans fatty acids.

In particular, it is an object of the present invention to provide methods for preparing full fat, reduced and low fat microwave popcorn products having at least a major portion of the fat component supplied by a thickened liquid oil.

Still another object of the present invention is to provide methods for preparing oil containing microwave popcorn articles that are resistant to oil leaking and seepage including articles comprising microwave popcorn bags that are fabricated from conventional two ply packaging stock.

Still another object of the present invention is to provide microwave popcorn fat components that are naturally low in trans fatty acids.

It has been discovered that the above objectives can be realized and superior microwave popcorn products provided by formulating food charge compositions disposed with conventional microwave popcorn bags, comprising popcorn, optionally salt and a thickened or viscous liquid oil in place of the typical solid oil. Such a liquid oil can have a melting point of $\leq 25°$ C. The oil can include an oil thickening ingredient such as a cyclodextrin in amounts sufficient to provide the desired degree of dimensional stability that minimizes oil leakage or seeping problems.

BRIEF SUMMARY OF THE INVENTION

In its article aspect, the present invention relates to improved microwave popcorn articles. The present microwave popcorn articles can comprise a microwave popcorn bag and a novel food charge dispersed therein. The food charge can comprises kernel popcorn and/or other pellets that expand upon microwave heating and viscous or thickened liquid oil component and can optionally further comprise salt.

The kernel popcorn component can comprises about 55% to 99% of the food charge. The food charge further can includes about 1 to 45% of liquid oil having a melting point of $\leq 25°$ C. The liquid oil can include a thickening ingredient such as cyclodextrin in amounts from about 0.01% to 25% of the oil ingredient. The food charge can optionally include about 0.1 to 5% salt.

In one product aspect, the present provides food compositions suitable for comprising an admixture of popcorn and thickened liquid oil useful in the provision of popcorn packaged food articles such as microwave popcorn articles.

In its method aspect, the present invention resides in methods for making full fat, reduced or low fat a microwave popcorn bag involving filling with popcorn kernels, thickened liquid oil having a melting point of $\leq 25°$ C., and optionally salt. The salt can be either ultra fine (mean particle size of about 20 µm or less), coarse salt (mean particle size of about 400 µm), or mixtures thereof.

The present methods of microwave popcorn article preparation comprise the steps of:
  A. providing a microwave popcorn bag having an open sealable top end defining an upper orifice and a seal area extending over the orifice in an open configuration and in a vertically aligned orientation;
  B. filling the bag through the upper orifice defined by the open top end with a quantity of kernel popcorn;
  C. filling the bag through the upper orifice defined by the open top end with a thickened liquid oil having a melting point of $\leq 25°$ C. and a temperature of 45 to 65° C. and 0% to 5% salt; and;
  D. sealing the open top end of the popcorn bag after the bag has been filled with the quantity of popcorn kernels, and the oil to provide a full fat, reduced fat or lowfat microwave popcorn article.

DETAILED DESCRIPTION OF THE INVENTION

The present invention relates to improved microwave popcorn articles and to their methods of preparation having low levels of saturated fat and trans fatty acids. The present microwave popcorn articles can comprise a microwave popcorn bag and a food charge disposed within the bag, said food charge comprising a quantity of 1) kernel popcorn, 2) thickened or viscous liquid oil, and, optionally 3) salt. Each of these article components as well as methods of filling, product use and attributes are described in detail below.

Throughout the specification and claims, percentages are by weight and temperatures in degrees Fahrenheit unless otherwise indicated. Each of the referenced patents and patent applications are incorporated herein by reference.

Microwave Bag

The present microwave popcorn articles can comprise a conventional microwave popcorn popping container. Useful microwave containers herein can include any container for microwave popcorn products presently known in the art or are developed in the future. Cardboard tubs have also been recently developed for microwave popcorn articles and can be used as the microwave container. Particularly useful herein for the microwave popping container are a wide variety of commercially available microwave bags for microwave popcorn. While in the present description particular attention is made to microwave popcorn bags since these are most commonly used, other popping container especially disposable containers, are contemplated.

For example, a suitable bag widely used commercially and preferred for use herein is described in U.S. Pat. No. 4,450, 180. A generally similar bag is described in U.S. Pat. No.

4,548,826 or in U.S. Pat. No. 4,973,810 entitled "Microwave Method Of Popping Popcorn And Package Therefor" issued Nov. 27, 1990 to Arne Brauner. Also useful are structures described in U.S. Pat. Nos. 4,735,513 and 4,878,765. Generally, the bags therein described comprise and are fabricated from a flexible sheet material having two collateral tubular sections. The sections are parallel longitudinally extending that communicate with each other at the center of the package.

Figure 1:
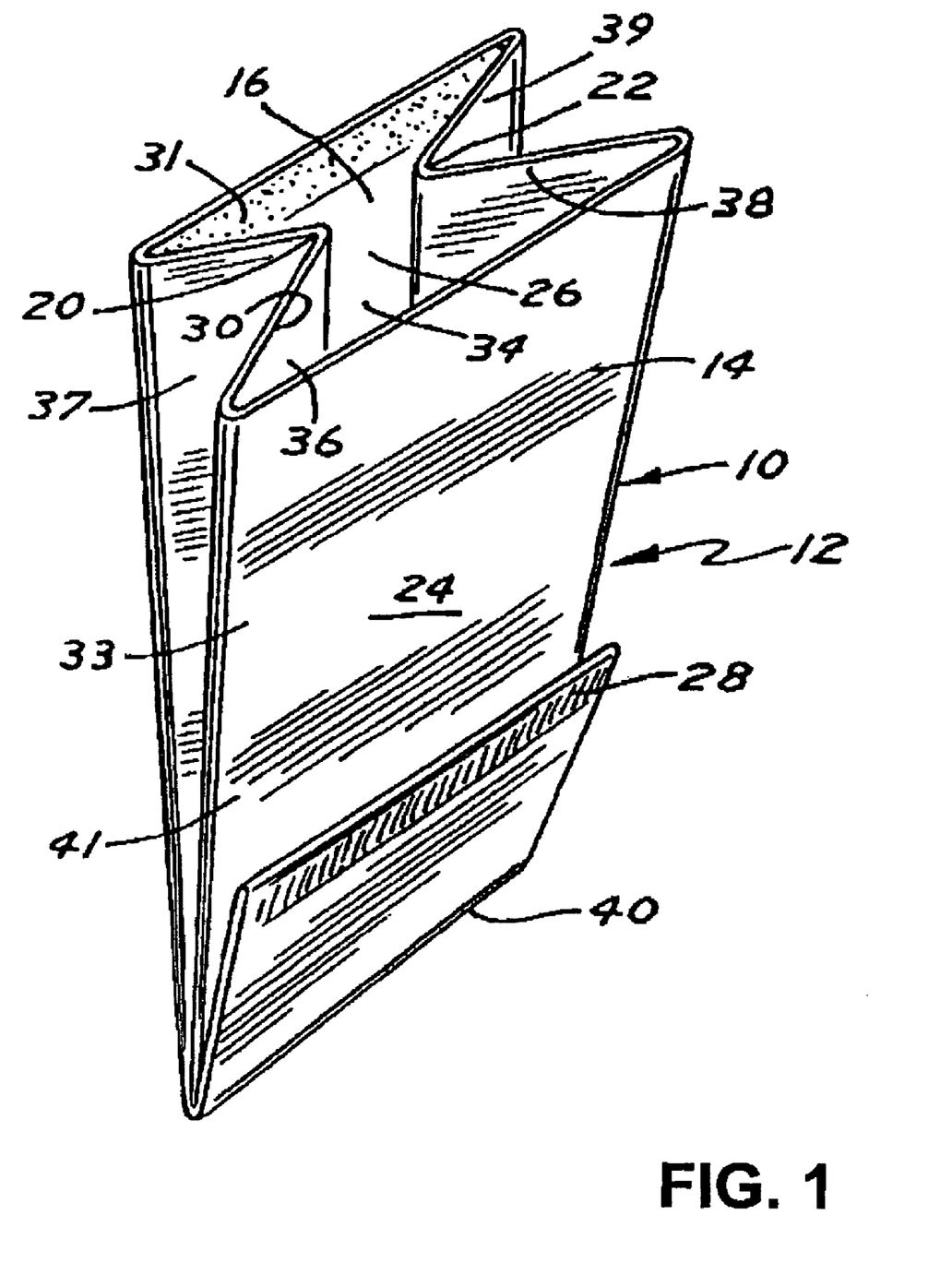
FIG. 1 is a perspective view of an unsealed, folded microwave popcorn bag.

Referring now briefly initially to FIG. 1, there is shown an embodiment of a microwave popcorn article 10 composed of a microwave bag 12 formed from flexible sheet material such as paper and being of collateral tubular configuration, that is to say, being composed of a pair of parallel longitudinally extending tubes 14 and 16 which communicate with one another along a central longitudinal opening 18. The two parallel tubes 14 and 16 are separated by longitudinally extending side indentations 20 and 22. When the package comprises a paper bag, the bag can be composed of first and second face panels 24 and 26 respectively and the indentations 20 and 22 comprises gussets. When in a vertically aligned orientation, the bag has a bottom seal 28 and initially an open top or orifice 30 but a sealable seal area 31 that transversely extends the open sealable top. The sealable area can include a heat activated adhesive or a "cold seal" adhesive, as is convenient. After being filled, the top 30 is also sealed conventionally by means of heat or other suitable adhesive to provide a top seal in the top seal area 31.

The bag material is generally fabricated with multiple plies including an outer ply 33 which is generally paper, a greaseproof or resistant inner ply 34 and microwave susceptor film member or ply intermediate these inner and outer paper layers. However, in preferred embodiments the microwave susceptor is present only on one major face panel.

While tubes (or chambers, or channels) 14 and 16 can be of equal size, conventionally the susceptor channel 16 is generally slightly smaller. In such a configuration, the gussets include major left gusset face 36, minor left gusset face 37, major right gusset face 38 and minor right gusset face 39. The bag 12 can be provided with a lower transverse fold 40 to define an intermediate portion or pocket 41.

Although in the present description, a particular description is given to this preferred microwave bag, the present invention is also useful in connection with, for example, flat bottomed bags, bags with or without a bottom fold, with a straight bottom seal or other more complex bottom seal designs. Also, the present methods can be employed using new and improved microwave popcorn bag designs.

For example, also useful herein are those microwave popcorn bags that are described in U.S. Pat. No. 5,958,482 "Easily Expandable, Nontrapping, Flexible Paper, Microwave Popcorn Package" issued Oct. 20, 1997; U.S. Pat. No. 6,066, 346 "Easily Expandable, Nontrapping, Flexible Paper, Microwave Package" issued May 22, 1998; U.S. Pat. No. 6,231,903 "Food Package For Microwave Heating issued Feb. 11, 1999; U.S. Pat. No. 6,259,079 "Microwave Food Package" issued Jul. 10, 2001; U.S. Pat. No. 6,306,448 "Easily Expandable, Nontrapping, Flexible Paper, Microwave Package" issued Jul. 15, 1999. Also useful are those Microwave bags that are described in PCT US2004/010471 Sweet Microwave Popcorn and Method of preparation filed Apr. 6, 2004. While less preferred for use herein, also useful are those microwave popcorn bags that are described in U.S. Pat. No. 5,679,278 "Microwave Container for Edible Oils. Still other microwave popcorn bags are described in U.S. Pat. No. 5,488, 220 and U.S. Pat. No. 6,046,443.

Also, while the present invention is particularly directed towards the provision of microwave popcorn articles that include a microwave popping bag, the skilled artisan will appreciate that the present intermediate food compositions comprising popcorn admixed with thickened liquid oil can be used in connection with other popcorn packaged food products. For example, certain popcorn articles comprise a combination packaging and preparation container or popping container for the at home stovetop preparation of popcorn. Such products can include a container typically fabricated from thin gauge aluminum with an expandable aluminum foil top that allows for expansion and containment of popped popcorn upon stovetop heating.

Popcorn

The present article 10 further can includes a food charge disposed within the bag. The food charge can includes a quantity of kernel popcorn and/or other puffable pellets. Conventionally, microwave popcorn formulations are now expressed based upon the weight of the entire kernel popcorn and fat food charge. This convention is followed in the present description of the invention. Broadly, the popcorn can range from about 55 to 99% of the popcorn charge. Typically, about 15 to 100 g of kernel popcorn is added to the bag, preferably about 55 to 85 g/bag for regular sized products and about 30 to 50 g/bag for "single portion" sized products. In general practice, the amount of kernel popcorn is set and the other ingredients are varied to provide full fat, reduced or low fat, and/or salted or low salt embodiments.

Conventional kernel popcorn varieties can be used and are preferred for use herein. Also useful herein are relatively larger kernel popcorn varieties for providing "Jumbo Pop" products as well as "mushroom" sized popcorn which is commonly used for ready-to-eat popcorn snack products. Useful are those larger varieties having a kernel count up to 60 kernels per 10 g, preferably less than 55, which are commercially available.

In certain less preferred variations, the popcorn can be infused with materials, e.g., flavor or colors, intended to provide popcorn products of enhanced visual or flavor appeal. In other variations, the popcorn can be bred to provide natural color and/or flavor variations.

Additionally, all or a portion of the microwave popcorn can be substituted with other microwave expandable pieces such as puffable pellets such as are described in the U.S. Pat. No. 4,409,250 "Method for Preparing Sugar Coated Puffed Snacks Upon Microwave Heating" issued Oct. 11, 1983 to Van Hulle et al. Also useful herein are those products described in U.S. Pat. No. 5,102,679 "Half products For Microwave Puffing Of Expanded Food Product" issued Apr. 7, 1992 to Whelan. See also U.S. Pat. No. 6,083,552 "Microwaveable Popcorn Product And Method" issued Jul. 4, 2000 to Kershman et al which describes a combination of puffable pellets admixed with popcorn. In certain variations comprising a blend of kernal popcorn and puffable pellets, the weight ratio of the kernal popcorn to puffable pellets can range from about 10:1 to about 1:10, preferably about 1:4 to about 4:1 and for best results about 1:3 to about 3:1.

Thickened Oil

The food charge of the present articles additionally comprise a quantity of an added (i.e., separate and apart from the oil associated with the kernel popcorn or puffable pellets) edible low melting point thickened or viscous oil. By "low melting point" is meant an oil having a melting point of 40° C. or less, preferably less than 25° C. and for best results having a melting point of less than 5° C. In another embodiment, the liquid oil component is selected such that it has a native (i.e., before having been complexed or thickened with the thickening ingredient) viscosity less than about 10,000 cP (centipoises) as measured by the test methodology described in ASTM test D1824-95 (2002) at 25° C.

The oil can be from any conventional, suitable oil(s) or mixtures thereof from natural or genetically modified vegetable, animal, or micro-organism sources including from butter, canola, corn, cottonseed, peanut, safflower, sesame, soybean, sunflower, rapeseed, rice bran, lard, tallow and mixtures thereof. Optionally, the oils can be winterized and/or polished. In preferred variations, the oils are not hydrogenated. In certain variations, the oils are obtained from seed varieties that have modified fatty acid compositions or contents relative to standard commercial oil seed varieties for added extended room temperature storage or improved interaction with thickening ingredients, e.g., high-oleic sunflower oil, high-linoleic soybean oil, although such specialty oils can be more expensive. Also useful herein is rice bran oil especially those that have been more carefully cleaned although current consumer taste preferences in the US do not favor use of rice bran oil. Also, in theory, highly purified (to reduce off flavors) marine oils such as menhaden fish oil could be used.

However, in certain variations, the thickened oils can include lesser amounts of hydrogenated fats. The oil is preferably fortified with anti-oxidants, e.g., up to 200 ppm of vitamin E, BHA (Butylated hydroxyanisole), BHT (butylated hydroxytoluene), TBHQ (Tert-Butyl Hydroquinone), and mixtures thereof, up to levels permitted by current food laws. If desired, in less preferred exceptions all or a portion of the oils can be mildly partially hydrogenated to increase stability so long as the degree of hydrogenation does not raise the melting point of partially hydrogenated oil to above 25° C. In certain variations, the oil constituent is principally a non hydrogenated oil to which low levels (e.g., less than 10% of the total added fat level) of hydrogenated fats are added. While such blended fats will not be free of trans fatty acids or saturated fats, at least the oil ingredients will have lower or reduced levels compared to products formulated with conventional hydrogenated fats.

Also useful herein are tropical oils such as coconut oil and palm or palm kernel oil, although present consumer health trends disfavor utilization of such oils. Also useful herein are non-absorbable fat mimics such as polyglycerol esters.

In still other variations, the oil can be or include a butter oil, i.e., a clarified oil ingredient derived from butter. In still other variations, the oil ingredient can include a butter ingredient whether a conventional butter (i.e., having a moisture content of about 10-15%) or a high butter fat low moisture (i.e., about 5% or less) butter.

The thickened or viscous oil additionally contains an oil thickening or viscosity building ingredient in amounts sufficient to provide sufficient dimensional stability to the oil during elevated summer distribution temperatures to minimize oil leaking or seeping from a conventional microwave popcorn container. In one variation, the oil can contain thickening levels of silicon dioxide in amounts such as are taught in, for example, U.S. Pat. No. 3,669,681. The '681 patent describes preparing a shortening for products which are heated prior to consumption, wherein edible oils are mixed with silicon dioxide and a bridging compound with the result being a shortening that is asserted to not weep or run at elevated temperatures while retaining desirable mouth feel characteristics of the untreated oil.). While useful, current food regulatory restrictions restrict employment of oils fortified with silicon dioxide.

In another embodiment, the oil can be thickened by inclusion of sufficient amounts of wax to provide the desired dimensional stability properties herein (See, for example U.S. Pat. No. 6,582,748 "Fat Compositions Containing Waxes" issued Jun. 24, 2003 to Loh et al. In still other variations, a liquid oil can be thickened with small quantities of a hardstock ingredient (e.g., about 3-8%) such as palm oil stearine. (For a description of such hardstocks, see for example U.S. Pat. No. 5,529,800 "Low Density Ready-To-Spread Frosting And Method Of Preparation" issued Jun. 25, 1996 to Bournes et al.)

In the preferred embodiment, the oil ingredient is thickened with and includes a starch based or carbohydrate (i.e., not a fat or emulsifier base or $SiO_2$ based) oil thickening ingredient especially a cyclodextrin thickening ingredient.

Preferred for use herein is a cyclodextrin oil thickening. A detailed description of viscous liquid oils thickened by cyclodextrins can be found in my co-pending U.S. Ser. No. 60/581,993 "Viscous Fat Compositions Having Low Amounts Of Trans-Fat, Methods And Products" (filed Jun. 22, 2004 by David Plank). Generally, the cyclodextrin component in one embodiment of the present invention comprises alpha-cyclodextrin, beta-cyclodextrin, gamma-cyclodextrin, or mixtures thereof. Cyclodextrins comprise a doughnut shaped or cyclical structure composed of a number of alpha-D-glucose units (typically 6-8) having a hydrophilic exterior and a hydrophobic interior. Cyclodextrins are generally water soluble, although alpha-cyclodextrin is likely more water soluble than beta-cyclodextrin or gamma-cyclodextrin, and free flowing crystalline powders that are substantially if not completely odorless and white in color.

In one embodiment of the invention, at least a portion and preferably substantially all the cyclodextrin is alpha-cyclodextrin. Alpha-cyclodextrin is a cyclized ring of six alpha 1,4 linked glucose units. Alpha-cyclodextrin has a cavity dimension of about 0.50×0.79 (nm). The solubility of alpha-cyclodextrin in water is good and at 25° C. is about 14 (gm/100 mL). In contrast, the native solubility of cyclodextrins in fats is poor. A useful Alpha-cyclodextrin is commercially available in the United States from Wacker Specialties, Adrian, Mich. 49221 and sold under the trademark CAVAMAX® W6 Wacker-Chemie, Burghausen, Germany.

In another embodiment of the invention, alpha-cyclodextrin is used in combination or synergistically with beta-cyclodextrin and/or gamma-cyclodextrin, in particular ratios dependent upon the requirements of the ultimate user. In an exemplary embodiment, alpha-cyclodextrin can be used individually or can be combined with between 0-50% by weight beta-cyclodextrin or gamma-cyclodextrin or with between 0.1 to about 40% by weight beta-cyclodextrin. Beta-cyclodextrins and gamma-cyclodextrins are also available from Wacker Specialties, Adrian, Mich. 49221.

One method of preparing cyclodextrins includes enzymatic treatment. Enzymatic degradation or treatment of the starch to produce cyclodextrins useful in the present invention is done through the use of cyclodextrin glucosyltransferase (CGTase, EC 2.4.1.19) or other enzymes, which results in a cyclic ring of sugar. In one method, cyclodextrins are produced by the action of cyclodextrin glucosyltransferase on hydrolyzed starch syrups at neutral pH (6.0-7.0) and moderate temperature (35-40° C.). Alternatively, cyclodextrins can be produced in planta by the expression of the gene encoding CGTase in the food plant of interest.

In preparation of the cyclodextrin/fat composition, fat components can be selected from oils and shortenings. Examples of such oils can include oil ingredients from vegetable, dairy and marine sources including butter oil or butterfat, soybean oil, corn oil, rapeseed or canola oil, copra oil, cottonseed oil, fish oil, safflower oil, olive oil, sunflower oil, peanut oil, palm oil, palm kernel oil, coconut oil, rice bran oil and other plant derived oils such as vegetable or nut oils. Examples of shortenings include animal fats such as butter and hydrogenated vegetable oils such as margarine. Mixtures of different fats are also contemplated.

In an embodiment of the invention, the fat comprises an oil selected from soybean oil, high-oleic sunflower oil, high-linoleic soybean oil, palm oil, palm kernel oil or coconut oil.

The oil ingredient can contain about 0.01% up to 50% of the cyclodextrin starch thickening ingredient preferably about 1% to about 25%. Moreover, in a preferred embodiment at least about 25% of the cyclodextrin in the oil ingredient is bound to the oil or fat ingredient. In additional embodiments of the invention, at least about 75% or 90% of the cyclodextrin in the composition is bound to the fat. In another specific embodiment, the oil contains sufficient amounts of alpha cyclodextrin with at least 25% cyclodextrin complexed with the oil such as to provide a viscosity (at 25° C.) to provide the thickened oil with a viscosity of at least double its native viscosity.

The oils can comprise or be emulsified or stabilized with mono- or diglycerides or other emulsifiers known in the art. Examples of emulsifiers include fully hydrogenated soybean oil mono-, di-, or tri-glyceride; mono-, di-, or tri-stearate, mono-, di-, or tri-oleate, fully hydrogenated high eruric acid rapeseed oil mono-, di- or tri-glyceride, sodium stearyl-2-lactylate, and mixtures thereof. Typically emulsifier utilization levels can range from about 0.1% to about 8% of the oil ingredient (not including the oil thickening ingredient).

Additionally, the fat/cyclodextrin composition can comprise adjuvants such as colorants, flavorants, texture modifiers, preservatives, stabilizers, and the like designed to improve the taste, appearance and nutritional properties of the finished products If present, each such adjuvant ingredient can be present in an amounts ranging from about 0.01% to about 5% of the thickened fat ingredient.

To prepare a thickened fat herein as described more fully in U.S. Ser. No. 11/158,747, a cyclodextrin component is first solubilized in water. Generally, the cyclodextrin is added to water in an amount up to the solubility of the cyclodextrin in the water at the temperature of mixing. In less preferred embodiments, the solubilizing ingredient for the cyclodextrin can be an alcohol especially and edible alcohol such as non denatured ethanol or mixtures of water and ethanol. In preferred embodiments, the water is at least deionized water and is preferably distilled water. Thus, at room temperature a typical process will include adding and mixing cyclodextrin to water in an amount of about 14% cyclodextrin by weight. Fat is then added to the cyclodextrin-water mixture preferably in liquid form (e.g., added at a temperature above its melting point) and preferably with vigorous agitation for durations sufficient to form a slurry of at least partially cyclodextrin complexed with the fat ingredient. This mixture is caused to separate into separate portions especially involving mechanical separation, wherein one portion is a thickened fat/cyclodextrin composition comprising fat that has been complexed with cyclodextrin. The separation step can include any appropriate technique, such as churning, centrifuging, hydrocyclone processing, decanting, and the like. At least about 25% of the cyclodextrin in this thickened fat/cyclodextrin composition is bound to the fat. The thickened fat/cyclodextrin composition is segregated from the remaining portions of the fat/cyclodextrin/water mixture. The preparation method can be practiced at temperatures ranging from about 5° C. to about 100° C. at atmospheric pressure. As noted above, in preferred form, the fat is added in the form of a liquid above its melting point and preferably to a water/cyclodextrin mixture at or above the fat's melting point to facilitate the formation of the cyclodextrin fat complex.

In an embodiment of the invention, the fat/cyclodextrin/water mixture is separated by centrifuging the mixture for a time and at a speed sufficient to separate the mixture into portions that are segregatable layers. This centrifuging operation can be carried out at any appropriate temperature. In one embodiment, the centrifuging operation is carried out at a temperature of about 5 to 25° C.

The segregatable layers can be characterized in any way appropriate to identify the desired portion for the particular use of the ultimate fat composition. For example, the fat/cyclodextrin/water mixture can be separated into at least first, second and third portions based upon density. In this embodiment, the first portion or lightest or least dense portion can be a thickened fat/cyclodextrin composition comprising fat that has been complexed with cyclodextrin, wherein at least about 25% of the cyclodextrin in the thickened fat/cyclodextrin composition is bound to the fat, the first portion having a density less than 1 g/ml. The second portion can be a more dense aqueous phase containing solubilized cyclodextrin. The third portion or heaviest portion can be a thickened fat/cyclodextrin composition comprising fat that has been complexed with cyclodextrin, the third portion having a density greater than 1 g/ml. In this embodiment, the first and third portions can find particular utility in various food products, where the removal of the second portion in this process assures that a low level of unbound cyclodextrin is present in the ultimate food product. Previous compositions comprising both cyclodextrin and fat did not contemplate removal of uncomplexed cyclodextrin as provided herein.

An improved method of preparation of facts thickened with cyclodextrin is described in U.S. Ser. No. 11/158,747 entitled "Viscous Fat Compositions Having Low Amounts Of Trans-Fat, Methods and Products" filed Jun. 22, 2005. The improved methods described therein provide for a dropwise addition of an aqueous suspension of cyclodextrin into a heated fat for improved efficiency in forming a fat cyclodextrin complex.

In an embodiment of the invention, the method additionally comprises the step of removing water from the thickened fat/cyclodextrin composition to an amount of less than about 10% by weight of the total thickened fat/cyclodextrin composition. In more preferred embodiments, substantially all moisture is removed from the thickened fat (i.e., to provide a moisture content of less than 1%). Removal of water can be carried out by any appropriate drying technique process, such as spray drying, paddle drying, drum drying, freeze drying, or evaporation of water by bulk heating.

Less preferred but nonetheless useful herein are reduced fat products. Low fat products have an even lower fat content than reduced fat embodiments. Reduced fat content products have a fatty triglyceride content of about 8 to 15% supplied herein by the added oil ingredient. All fat percentages are descriptive of added fat and are not meant to include fat or lipid content which may be included in the finished product from other ingredients, e.g., the corn oil native to the kernel popcorn. Thus, broadly, the oil can range from about 1 to 20% and about 8 to 15%, (most preferably 10 to 14%) for reduced fat embodiments. In the low fat embodiments the charge can comprises about 1 to 8% oil, preferably 3 to 4% oil and for best results about 3.5%.

The present invention finds particular suitability for use in connection with microwave popcorn products that are perceived as being more healthy, such as low trans fatty acid level microwave products. Thus, in preferred embodiments the liquid oil is characterized by low levels of trans fatty acids.

More particularly, the thickened oil components herein have trans fatty acid levels of less than 25%, preferably less than 5% and in a preferred embodiment, less than 1% of the thickened oil ingredient. (Since the starch cyclodextrin contributes no trans fat faction, these percentages are of the added thickened oil ingredient itself).

Salt

The present microwave popcorn articles can optionally additionally include a salt component. Typically, the salt component is a microsized salt, also known as ultrafine salt or pulverized salt or "flour" salt, typically having a mean particle size of about 22 microns or less. If employed, this flour salt is simply physically admixed in with the thickened liquid oil to form an oil and salt slurry.

In the preferred embodiments, at least a portion of the total salt can be added in the form of a flour sized particulate to the slurry. In those embodiments, it is more preferred that the portion of the total salt added as a salt flour to the slurry be at least 60% of the total salt, even preferably more than 75% of the total salt.

In other variations, a coarse salt ingredient can be employed such as described in co-pending commonly assigned U.S. Pat. No. 5,897,894 entitled "Microwave Popcorn With Coarse Salt Crystals and Method of Preparation" issued Dec. 29, 2002. Generally, the coarse salt therein described has a larger particle size of about 250 to 600 μm. Such coarse salt is added to impart an organoleptic attribute in the finished product microwave popcorn to be more reminiscent of the stove-top at-home popped and seasoned popcorn. While in the preferred embodiments herein the salt ingredient is in flour form, in other embodiments all or a part of the salt can be in the form of coarse salt added in the third station or in the separate particulates addition step herein.

Optional Ingredients

The present microwave popcorn products can optionally further comprise a calcium ingredient of defined particle size in an amount effective to provide the desired calcium enrichment. Good results are obtained when the present microwave popcorn products contain about 360 to 3600 mg per 100 grams of the food charge. Better results are obtained when the calcium is present at levels of about 360 to 1800 mg per 100 grams. For best results, the total calcium present ranges from about 930 to 1400 mg per 100 grams of the food charge. Excessive calcium fortification is to be avoided in part because the finished product can undesirably exhibit a dry texture, gritty mouth feel, and lower taste perception of flavor and salt.

At a calcium concentration of 360 to 930 mg per 100 grams of the food charge, the finished popped product provides about 10% of the currently recommended daily intake for calcium and thus can be described as "a good source of calcium." The levels in the microwave article suitable for microwave popping account for an estimated 40% loss factor for calcium as the popcorn goes from its unpopped state to the popped state. In addition, these levels also reflect the amount consumed based on the current serving size of 30 grams for popped product as defined by the Food and Drug Administration (FDA).

Useful herein are calcium ingredients that supply at least 20% calcium. For example, a good calcium ingredient herein is calcium carbonate in that calcium carbonate comprises about 40% calcium. While expensive, food grade calcium carbonate obtained by chemical reaction processes is desirable due to low levels of impurities. A good, inexpensive source of calcium carbonate from natural sources is ground limestone. Care should be exercised in selecting sources of ground limestone that are low in trace metals, especially such heavy metals such as lead. In particular, it is desirable that the ground limestone have trace metal concentrations of less than 10 ppm.

Soluble calcium salts typically are expensive and contain low weight percentages of calcium. While calcium chloride is an exception to this generalization, addition of significant calcium levels supplied by calcium chloride impart an unacceptable bitter flavor to microwave popcorn products. In addition, by adding sufficient amounts of many of these calcium salts to achieve the desired fortification level, the finished product may exhibit an undesirably dry texture and gritty mouth feel.

Also useful herein are insoluble mineral calcium salts, particularly calcium phosphate salts provide high levels of calcium and are relatively inexpensive. Moreover, such calcium phosphate salts can be used to provide calcium at high fortification levels with an acceptable taste. Calcium phosphate is generally available as a monobasic ($CaH_4(PO_4)2.H_2O$), dibasic ($CaHPO_4.2H_2O$) or tribasic ($Ca_3(PO_4)_2$) salts. Preferred for use herein is tricalcium phosphate, $Ca_3(PO_4)_2$, ("TCP") because of its high weight percentage of calcium (about 38%). Moreover, TCP is slightly more soluble than other calcium phosphate salts.

A useful tricalcium phosphate starting material is also known as tribasic calcium phosphate or tricalcium orthophosphate and is available in food chemicals codex grade from Monsanto or Rhone Poulenc, having the general formula $3Ca_3(PO_4)_2.Ca(OH)_2$. This product provides an assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

Phosphate salts are a preferred source of calcium, not only because of their acid solubility and weight ratios, but also because they are available commercially as a precipitate from whey, a natural dairy product.

The skilled artisan will appreciate that while these calcium phosphate salts are characterized herein as insoluble, of course, some small percentage will dissolve in water depending in part upon the temperature and pH.

Preferred for use herein are calcium ingredients selected from the group consisting of food grade calcium carbonate, ground limestone, calcium phosphate salts and mixtures thereof.

The calcium ingredient regardless of source or type is further can characterized by a particularly fine particle size. Such a fine or flour form of the calcium ingredient provides a particle size such that the average particle size is less than 25 μm.

Even more preferred for use herein are calcium ingredients having a mean particle of less than 15 μm and for best results less than 10 μm. A good material, for example, is a ground limestone of high purity having an average particle size of 3.8 μm available from Pluess-Stauffer (California), Inc. (Lucerne Valley, Calif.).

While in the preferred embodiment the particulate addition in the third or separate particulate addition step after the slurry has been added a calcium ingredient, the skilled artisan will appreciate that other particulates can be conveniently added in the third filling station or in this step. Such additional particulates can include a wide variety of materials intended to provide various flavor or nutritional advantages. Such materials include sugars, dried dairy ingredients such as dried cheese solids, other minerals, magnesium oxide and mixtures thereof.

However, in more preferred embodiments, the present microwave products are additionally characterized as being sugar free (i.e., by total mono- or disaccharide content of less than 0.5%). Such products exhibit greater shelf stability as well as minimization of sugar related scorching and burning. However, certain styles of microwave popcorn such as kettle corn style microwave popcorn can include a non sugar high, sweetening ingredient as the sole or principle sweetener. Preferred for use herein for the high potency sweetening ingredient is a thermally stable sweeteners such as sucralose, acetysulfame (especially acesulfame potassium colorquitly referred to as ("ace K"), alitame, saccharine and mixtures thereof. (While saccharine and cyclamates are operable, current food regulations do not permit their use in microwave popcorn products). The high potency thermally stable sweetener can be used at levels effective to provide a sweet taste. Good results are generally obtained when the food charge includes about 0.001% to about 1% high potency sweetener. Better results are obtained when the high potency sweetener is present in the food charge at levels ranging from about 0.01% to about 0.5%. Preferred for use herein is sucralose due to its flavor profile. Of course, new thermally stable high potency sweeteners may be developed and/or permitted by food regulation laws and are contemplated for use herein as developed and permitted from time to time.

In other more preferred embodiments, the present microwave products are additionally characterized as being free of a cheese constituent (i.e., having a cheese ingredient content of less than 0.5%, dry weight basis). Cheese ingredients can also undesirably contribute to scorching and burning problems in microwave popcorn products. It is believed that these problems are due to the protein and sugar (e.g., lactose) constituents thereof. Thus, dried cheeses being generally low in fat and thus high in other constituents are particularly undesirable. However, the food charge can include a cheese mimic, e.g., a combination of cheese flavor and colorant.

In highly preferred embodiments, the present articles are both sugar(s) free and cheese ingredient free.

The food charge can of course contain a wide variety of colors, flavors and adjuvant ingredients to improve the color, flavor or nutrition of the finished popcorn prepared from the present microwave popcorn products. Various flavors, e.g., cinnamon, can be used, if desired. Such flavors tend to go in and out of favor with consumers with passing consumer trends.

Method of Preparation

In upstream stations, the bag or container is fabricated. For example, the tubular bag material is cut into desired lengths, and is provided with the bottom seal. Additionally, in upstream stations (not depicted), the bags are preferably folded to have their bottom third folded up to provide the first lower transverse fold to provide a sealed portion so that the kernel popcorn, oil charge, and salt can be positioned within the bag in the desired middle portion thereof. The bags are advanced from station to station by suitable drive means such as the endless drive chain having bag engagement clips. Packaging line speeds range from about 50 to 100 bags per minute. Also, the bottom third of the bags are maintained in the closed position by appropriately spaced parallel guide bars. The bag has an open sealable top portion defining an orifice and has a seal area extending across the orifice. The bag is provided in an open configuration and in a vertically aligned orientation.

In the present preferred method of filling microwave popcorn bags, the first station is a popcorn filling station. In the popcorn filling station, the kernel popcorn and/or other puffable pellets is added to the microwave popcorn bag (or other container).

The thickened oil addition in a preferred variation can be charged to the bag at a second separate station. However, in other variations, the popcorn and oil charging steps can be practiced simultaneously at the same station. Conveniently, salt and any other flavor, color, and/or nutrition ingredients can be added to the thickened oil to form a slurry. The slurry can be heated to thin the slurry for easy of handling and addition to f, for example, temperatures ranging from about 60° C. (110-140° F.).

Thereafter, the bags being maintained in the upright, folded orientation are advanced to the third particulate filling station. At the particulate filling station, a quantity of a particulate ingredient(s), e.g., calcium ingredient, can be then charged to the bag in a separate step, if desired.

As noted above, in various manufacturing arrangements, one or more of the ingredient additions can be practiced at a single filling station whether for simultaneous addition, overlapping, or sequential addition.

Once filled with the popcorn, thickened oil slurry and particulate, if any, the bags are then advanced to the sealing station (not shown) wherein the open top end is sealed such as by retractable heat or pressure sealing jaws which impart a seal in the seal area.

The filled and sealed microwave popcorn bags are then advanced to subsequent downstream packaging operations (not shown). Such subsequent downstream packaging operations can include folding the bags again to provide a three-folded bag, i.e., to provide a second upper transverse fold; overwrapping the folded bags with an overwrap or moisture barrier layer; and inserting desired numbers of the packaged article into cartons.

Now that the present methods have been described in general terms, in particular, at the filling station the process involves the step of filling the bag through the upper orifice with a quantity of popcorn kernels. Generally, however, the process step can conveniently be practiced at filling station by employing a means for dispensing a measured quantity of kernel popcorn such as a dispensing wheel. The dispensing wheel discharges at timed intervals a measured quantity (e.g., 80 to 90 g or less for single serve products) of the kernel popcorn into a vertically oriented filling horn or funnel. The funnel causes the kernel popcorn to fall by gravity into the bag. The kernel popcorn has a temperature of $\leqq 90$ F ($32°$ C.).

At the second or oil slurry filling station, the present methods additionally include the step of filling the bag 12 through the upper orifice with a quantity of liquid oil (with or without butter). The liquid oil is characterized by a melting point value of $\leqq 122°$ F. (less than or equal to $50°$ C.). The thickened liquid oil is supplied from an oil supply or reservoir at a temperature of 110 to $140°$ F. (43-60 C).

The term slurry is used herein as is common in the microwave popcorn art to refer to any coating applied to the kernel popcorn. The term "slurry" as used generally herein thus includes the thickened oil alone; oil and a lesser portion of salt in flour form; oil, flour salt, flavors and/or color or sweetener (s); as well as any other variation or combination of ingredients used as an addition to the kernel popcorn herein.

The slurry can additionally optionally comprise minor amounts of other materials employed to make the microwave popcorn more aesthetically or nutritionally or organoleptically appealing. Such adjuvant ingredients can include, for example, sweetener(s), minerals, vitamins, colorants, preservatives and flavors. If present, each of these constituents can comprise from about 0.01 to about 2% by weight of the fat slurry.

Especially popular for use herein is a butter flavor. The flavors can be either in liquid, fat soluble forms and/or in dry powder forms such as a liquid oil absorbed onto a particulate carrier, e.g., gum arabic, starch, silicon dioxide, or dehydrated cheese solids. Also useful herein is butter oil.

The thickened oil slurry is prepared simply by admixing the thickened oil together with any optional ingredients with salt and blending the mixture to form a stable dispersion or slurry. The oil or slurry, is then sprayed into the microwave popcorn bag or onto the falling popcorn cascade as described in detail below.

The slurry application step can be practiced by employing an applicator for spraying the oil slurry (e.g., commercially available from Hibar Systems Limited, Ontario, Canada) that is supplied by a slurry supply means (not shown). The slurry supply means can conveniently include a conventional positive displacement reciprocating metering pump having a piston and a pressurized slurry inlet. The pump precisely pumps metered amounts of the fat slurry to the applicator at closely controllable time intervals.

If the slurry viscosity is too high, then the slurry becomes unpumpable. The concentrations of salt oil and other ingredients are selected such that the slurry has a viscosity of less than 10,000 cps, preferably less than about 4,000 cps, and, for best results, less than 1,000 cps.

The slurry can be added at temperatures ranging from about 15° to 65° C. (60° to 150° F.), preferably about 43° to 60° C. (110 to 140° F.).

In an embodiment of the present invention, the oil or slurry has a spray temperature of between about 120° to 130° F. (49° to 54.5° C.). Preferably in this embodiment, the food charge contains sufficient amounts of the oil thickening ingredient to provide the oil with a viscosity of about 20,000 cP. at 25° C.

While a pencil jet spray is preferred for use herein, equivalents thereof in terms of dispensing the slurry can also be used. For example, a multiplicity of very fine jet streams, (e.g., 3-12), or a sparge can be used to achieve the desired dispersion hereunder. Also, other spray types, (e.g., a cone spray, a mist spray, or a fan spray) are useful herein. However, great care must be taken in selecting such useful alternatives so as to avoid getting slurry in the bag seal area. In other embodiments, the spray can be gas assisted, e.g., air, steam, or inert gas.

In preferred embodiments, the bag 12 has a microwave chamber (i.e., wherein one major face panel has an intermediate microwave susceptor layer between the inner and outer bag layers) and, for cost considerations, a microwave susceptor-free chamber. In the preferred practice, the kernel popcorn, fat slurry and particulate(s) are charged to the microwave channel. Conventionally, the microwave channel is the lesser channel (i.e., being formed by the smaller major face 24) and the greater channel is the microwave free channel. Such a configuration minimizes the amount of relatively expensive microwave susceptor material required while nonetheless providing the needed expansion volume upon microwave popping.

In the preferred form, the popcorn charging and slurry addition are practiced at separate stations and as separate steps. However, in other embodiments, the kernel popcorn and slurry addition can be practiced in a single station concurrently. Apparatus and techniques for such concurrent filling of the popcorn and slurry are described in commonly assigned U.S. Pat. No. 5,690,979 (issued Nov. 25, 1997) entitled "Method Of Preparing Reduced Fat Microwave Popcorn."

The present methods additionally comprise the step of filling the bag with a quantity of a particulate after the bag is filled with popcorn and fat. Generally, however, the particulate filling station includes a means for dispensing a measured quantity of salt, calcium ingredient(s), other particulates and mixtures thereof.

The present methods further can include a conventional finish step of sealing the open end of the microwave popcorn bag after the bag has been filled with the quantity of popcorn kernels, the oil slurry and the quantity of particulates.

By virtue of having been prepared using a liquid oil, upon further handling the filled bag articles are much less likely to disrupt the manufacturing process. An advantage of the present microwave popcorn bag articles that include a cyclodextrin thickened oil or fat ingredient is a reduced tendency to oil weeping or oil leakage.

Product Use

The thickened liquid fat microwave popcorn products prepared as described can be used in a conventional manner for the at-home preparation of popcorn by microwave heating. Upon microwave heating of the sealed microwave popcorn article in a conventional home microwave oven, the resultant popped popcorn in the form of free flowing of individual substantially unagglomerated popped popcorn kernels exhibits excellent organoleptic properties.

The present invention finds suitability for use in the provision of a mass market, shelf stable consumer food item adapted to flavored popcorn upon microwave heating such as in a home microwave oven.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the microwave popcorn art, can be undertaken without departing from the spirit and scope of the invention.

Example 1

An improved microwave popcorn article of the present invention comprising a microwave popcorn bag is prepared having the popcorn/oil charge of the composition indicated below. The microwave popcorn bag is fabricated substantially in accordance with the teachings of U.S. Pat. No. 4,450,180. Microwave popcorn articles comprising microwave popcorn bags of this type are available under the brand name Betty Crocker™/Pop Secret™. The popcorn fat charge has the following composition:

| Ingredients | Weight % |
| --- | --- |
| Popcorn | 85.1 |
| Oil | 4.4 |
| Alpha cyclodextrin | 2. |
| Salt | 5.2 |
| | 100.0 |

A supply of the oil, butter, salt and is prepared to form a warm slurry (about 122° F.; 50° C.). The slurry has a viscosity of 3500 cps.

The fat slurry comprises:

| | |
|---|---|
| Soybean Oil | 44.5% |
| Salt | 25.7% |
| Butter Oil | 29.8% |

The salt added to the slurry was a flour salt having a mean particle size of about 22 μm.

A quantity of microwave popcorn bags were filled as follows:

About 69 g of popcorn was dispensed by the dispensing wheel into the funnel.

The popcorn filled bag was then advanced to a second filling station. A oil slurry applicator was timed to dispense about 37 g of the slurry in the form of a downwardly projecting vertically aligned pencil jet spray. The duration of the spray was about 0.5 seconds. The slurry charged the oil slurry within the microwave popcorn bag below the seal area.

The bags were then heat sealed to form finished reduced fat microwave popcorn articles of the present invention. The articles can be further provided with a conventional moisture resistant overwrap (e.g., fabricated from polypropylene material).

What is claimed:

1. A method for preparing a full fat, reduced or low fat microwave expandable pieces article by filling with a food charge comprising microwave expandable pieces and thickened oil, comprising the steps of:
   A. providing a microwave popcorn bag or container having a sealed portion and an open sealable top portion in an open configuration and in a vertically aligned orientation defining an upper orifice;
   B. filling the bag or container through the upper orifice with a quantity of microwave expandable pieces;
   C. filling the bag or container through the upper orifice with a quantity of a thickened liquid oil, said oil having
      a melting point of <25° C.,
      a native viscosity, and
      wherein the thickened oil is prepared from an oil that has been thickened to a viscosity of at least twice its native viscosity by
         (i) solubilizing a cyclodextrin component in water to form a cyclodextrin-water mixture
         (ii) adding liquid oil to the cyclodextrin-water mixture to form a slurry of an oil/cyclodextrin/water mixture having cyclodextrin at least partially complexed with liquid oil,
         (iii) causing the slurry to separate into separate portions, wherein one portion is a thickened oil/cyclodextrin composition comprising oil that has been complexed with cyclodextrin, and
         (iv) segregating the thickened oil/cyclodextrin composition from the remainder of the oil/cyclodextrin/water mixture to provide a thickened liquid oil; and
   D. sealing the open top end of the popcorn bag or container after the bag or container has been filled.

2. The method of claim 1 wherein the food charge is substantially free of an oil having a melting point of greater than 10° C.

3. The method of claim 1 wherein at least a portion of the cyclodextrin is alpha cyclodextrin.

4. The method of claim 3 wherein at least a portion of the oil is supplied by a butter oil.

5. The method of claim 4 wherein the thickened liquid oil is heated to about 43° C. to about 60° C.

6. The method of claim 5 wherein the thickened liquid oil has a spray temperature of between about 120° to 130° F. (49° to 54.5° C.).

7. The method of claim 6 wherein the food charge contains sufficient amounts of the cyclodextrin to provide the oil with a viscosity of about 20,000 cP. at 25° C.

8. The method of claim 6 wherein the microwave container is a microwave popping bag.

9. The method of claim 1 wherein at least 25% of the cyclodextrin is complexed with the oil.

10. The method of claim 1 wherein the thickened oil/cyclodextrin composition has a density less than 1 g/ml.

11. The method of claim 1 wherein the thickened oil/cyclodextrin composition has a density greater than 1 g/ml.

* * * * *